United States Patent [19]

Hill et al.

[11] Patent Number: 4,574,068

[45] Date of Patent: Mar. 4, 1986

[54] UNIVERSAL LOGIC CARD

[75] Inventors: William D. Hill, San Jose; William A. Mercanti, Jr., Campbell; Christian K. Apple, Mountain View, all of Calif.; Gary S. Loomis, Johnston, R.I.

[73] Assignee: General Electric Company, San Jose, Calif.

[21] Appl. No.: 717,467

[22] Filed: Mar. 27, 1985

Related U.S. Application Data

[63] Continuation of Ser. No. 449,221, Dec. 14, 1982, abandoned.

[51] Int. Cl.$^4$ ............................................. G21C 17/00
[52] U.S. Cl. ..................................... 376/259; 376/215; 376/217
[58] Field of Search ...................... 324/73 AT, 73 PC; 364/488, 489, 490, 495, 551, 580; 371/20; 376/215, 217, 259

[56] References Cited

U.S. PATENT DOCUMENTS

| | | | |
|---|---|---|---|
| 4,000,460 | 12/1976 | Kadakia et al. | 371/20 |
| 4,055,801 | 10/1977 | Pike et al. | 324/73 AT |
| 4,354,268 | 10/1982 | Michel et al. | 371/20 |
| 4,434,132 | 2/1984 | Cook | 376/215 |

OTHER PUBLICATIONS

IEEE Transactions on Nuclear Science, vol. NS-27, No. 1, Feb. 1980.
Nuclear Energy, 1980, vol. 19, Feb., No. 1, 53-59.
Nuclear Engineering International, Jul. 1982, 41-43.

Primary Examiner—Deborah L. Kyle
Assistant Examiner—Richard W. Wendtland
Attorney, Agent, or Firm—Iver J. James, Jr.; Samuel E. Turner

[57] ABSTRACT

A universal logic card is disclosed which contains both pre-programmed functional circuitry for actuating channel logic and dedicated test circuitry for system controller test and for constant and looping interrogation of the pre-programmed channel logic in absence of self-test system controller test. The disclosed card resides as a channel in a self-test system for a nuclear power plant supplementing the nuclear reaction protection system. The card is pre-programmed in digital logic to act equivalent to an analog circuit during actual plant operation. Additionally, the card responds to system controlled surveillance of the nuclear protection system. In system controlled surveillance, a central microprocessor serially addresses system circuit cards such as the one disclosed and loads these cards at predetermined input points with test commands. The addressed cards are thereafter simultaneously activated by a system-wide command. A test pulse, whose duration is so short that it is in effect transparent to the system and therefore cannot cause overall operation, is released. The pulse passes through the pre-programmed channel logic on the universal card along the actual program actuated components to verify, on the real actuating path, the operating integrity of the system. After an appropriate response interval, the output state of the system is recorded in output registers and thereafter read under control from the controller computer memory. Finally, the programmed card in the absence of system-wide test is monitored by a looping secondary computer, which computer reads the card inputs and outputs, verifies the RAM and ROM memories, constantly monitors the system timers, and dependent upon overall state verifies the accuracy of transfer function within the card.

This test circuitry is in effect disabled upon system controller testor only and even remains in operation during actual system manipulation using the programmed digital logic.

2 Claims, 16 Drawing Figures

Microfiche Appendix Included
(2 Microfiche, 68 Pages)

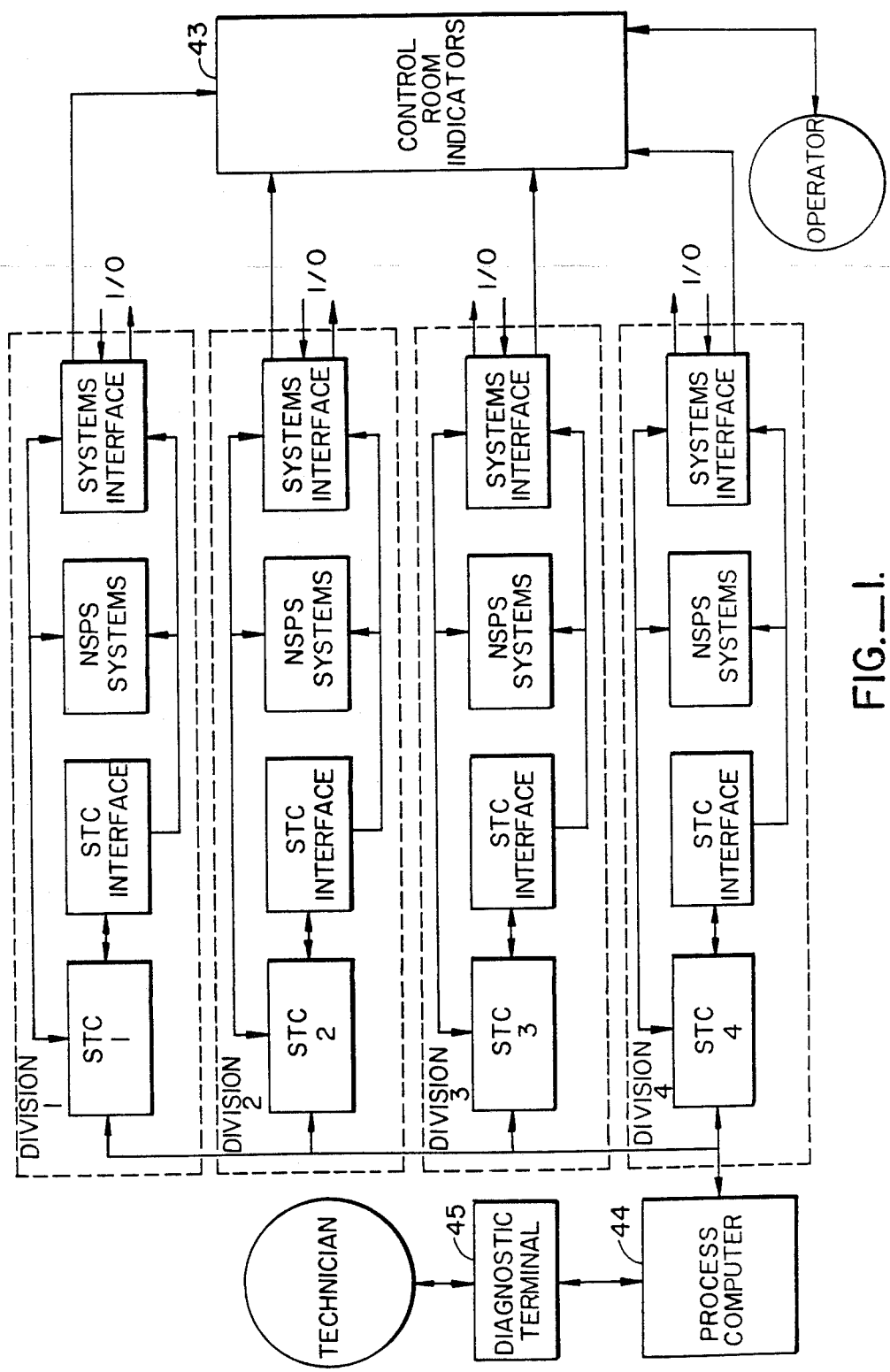
FIG._1.

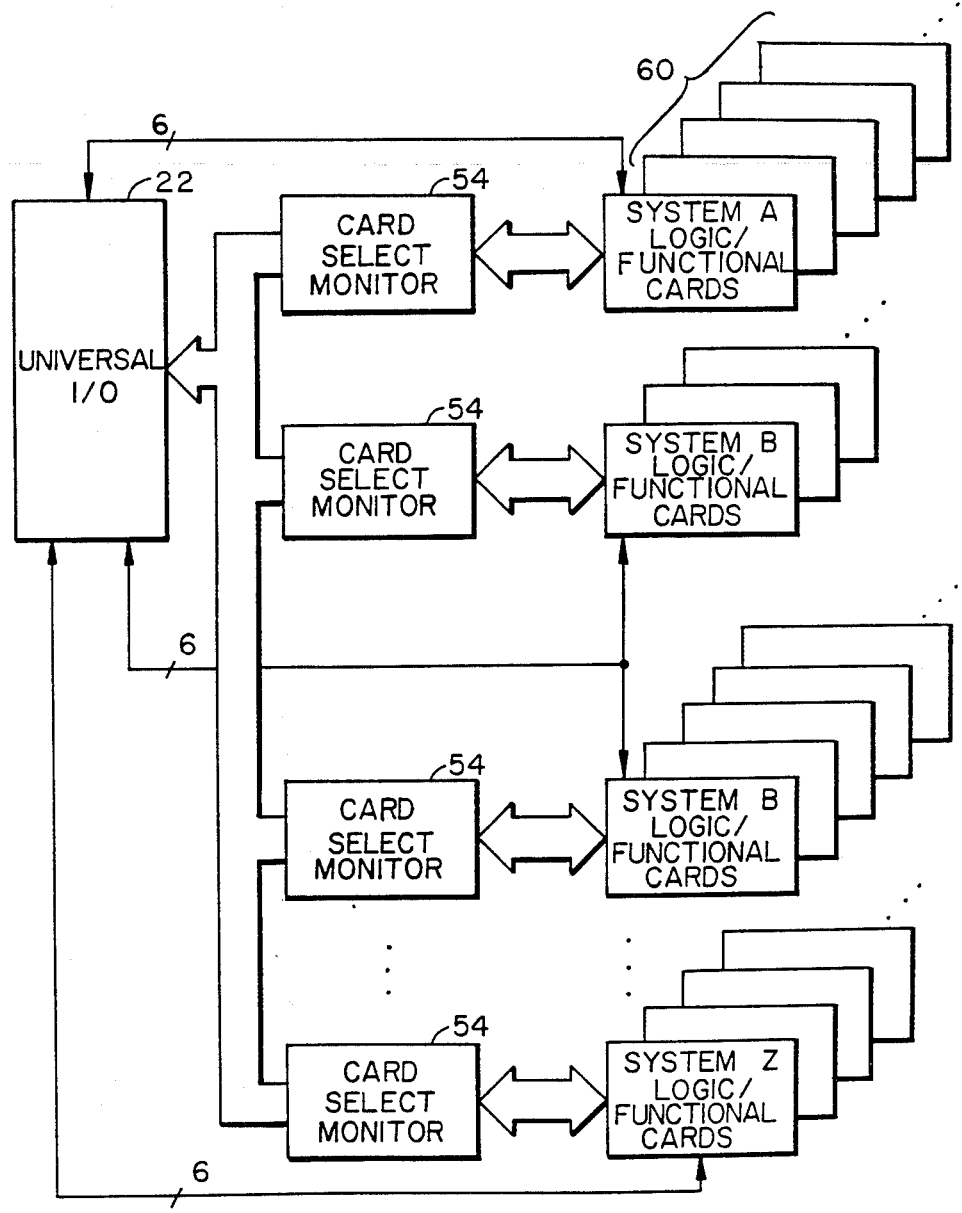
FIG._2.

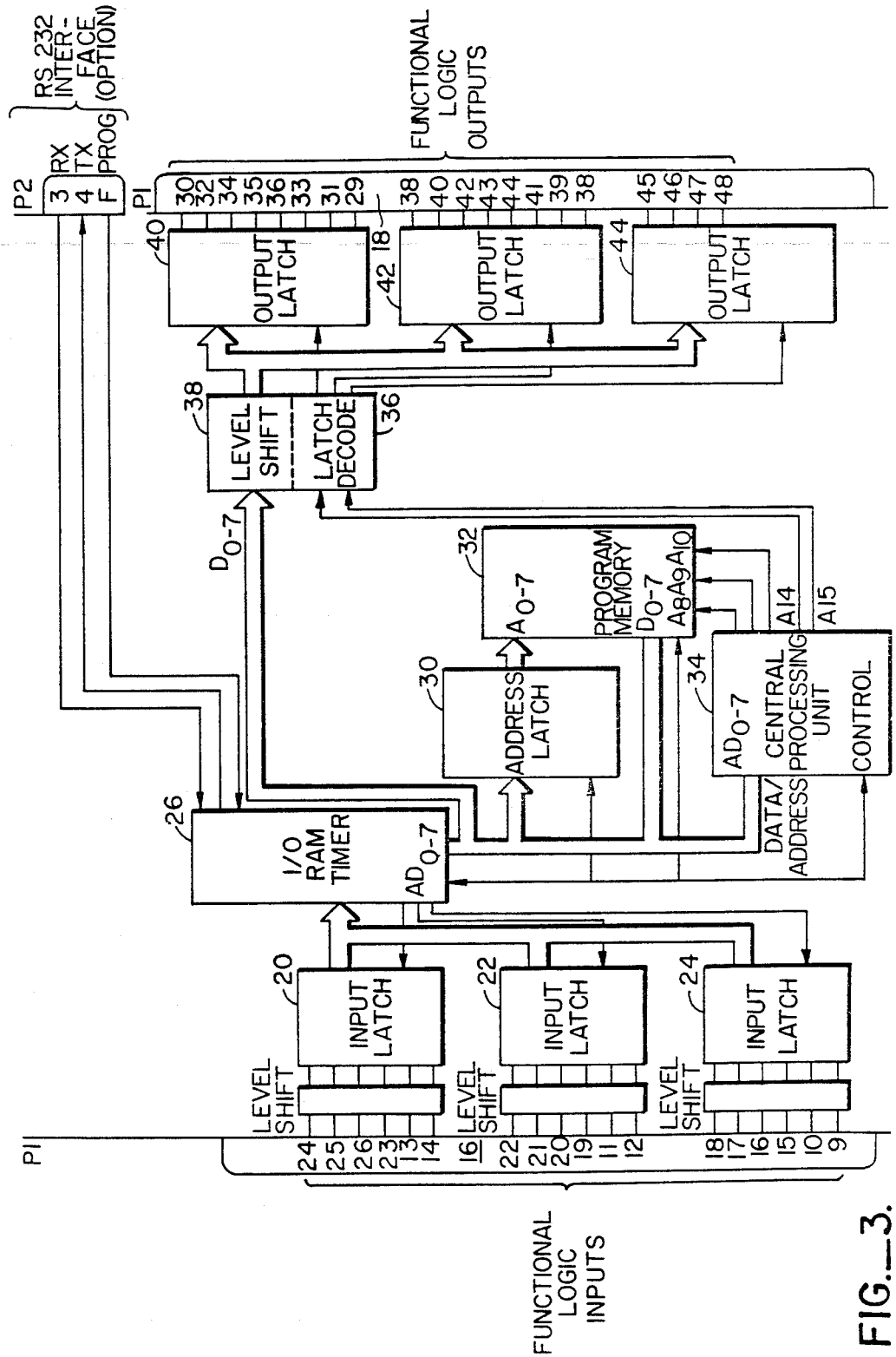
FIG._3.

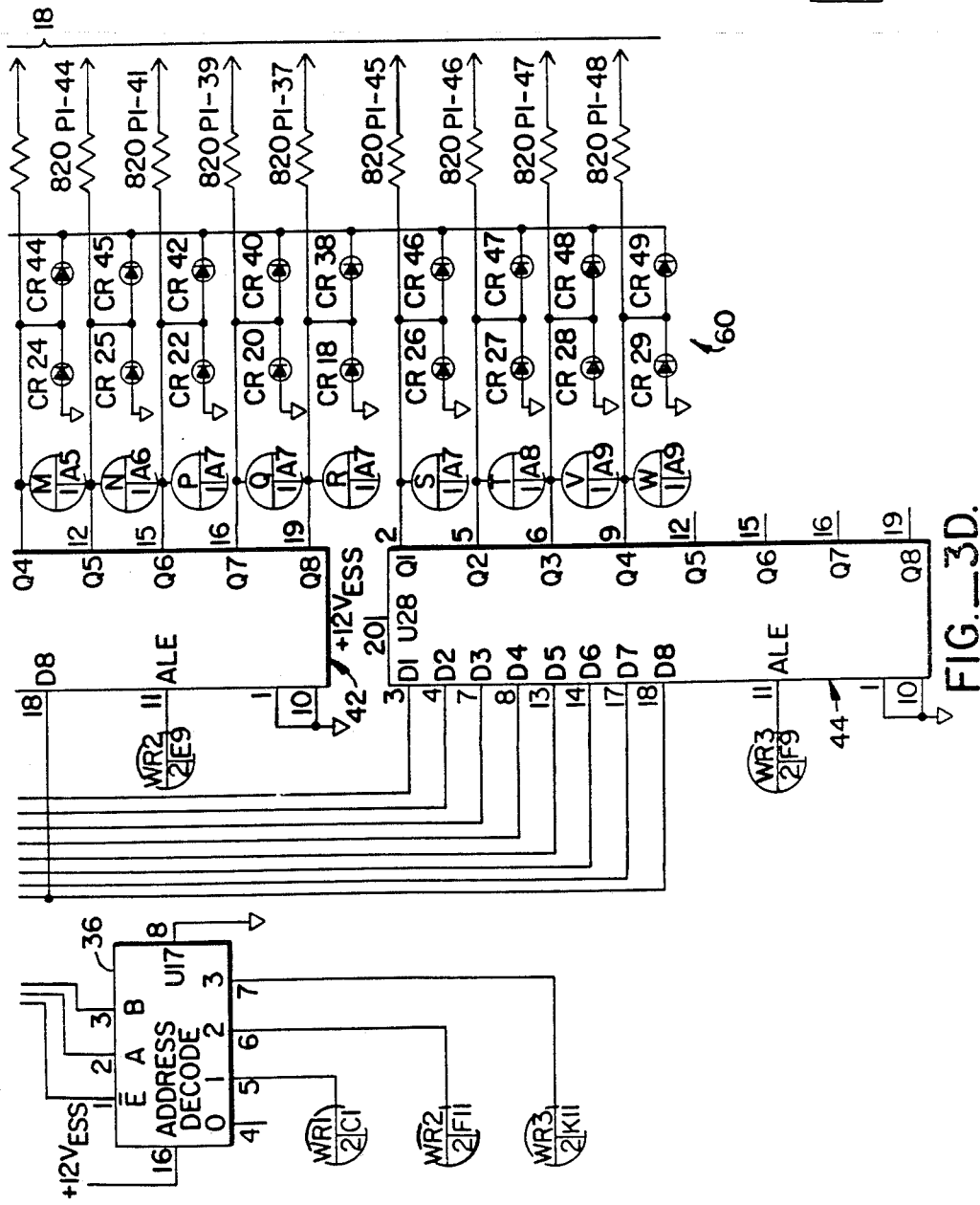
FIG._3.

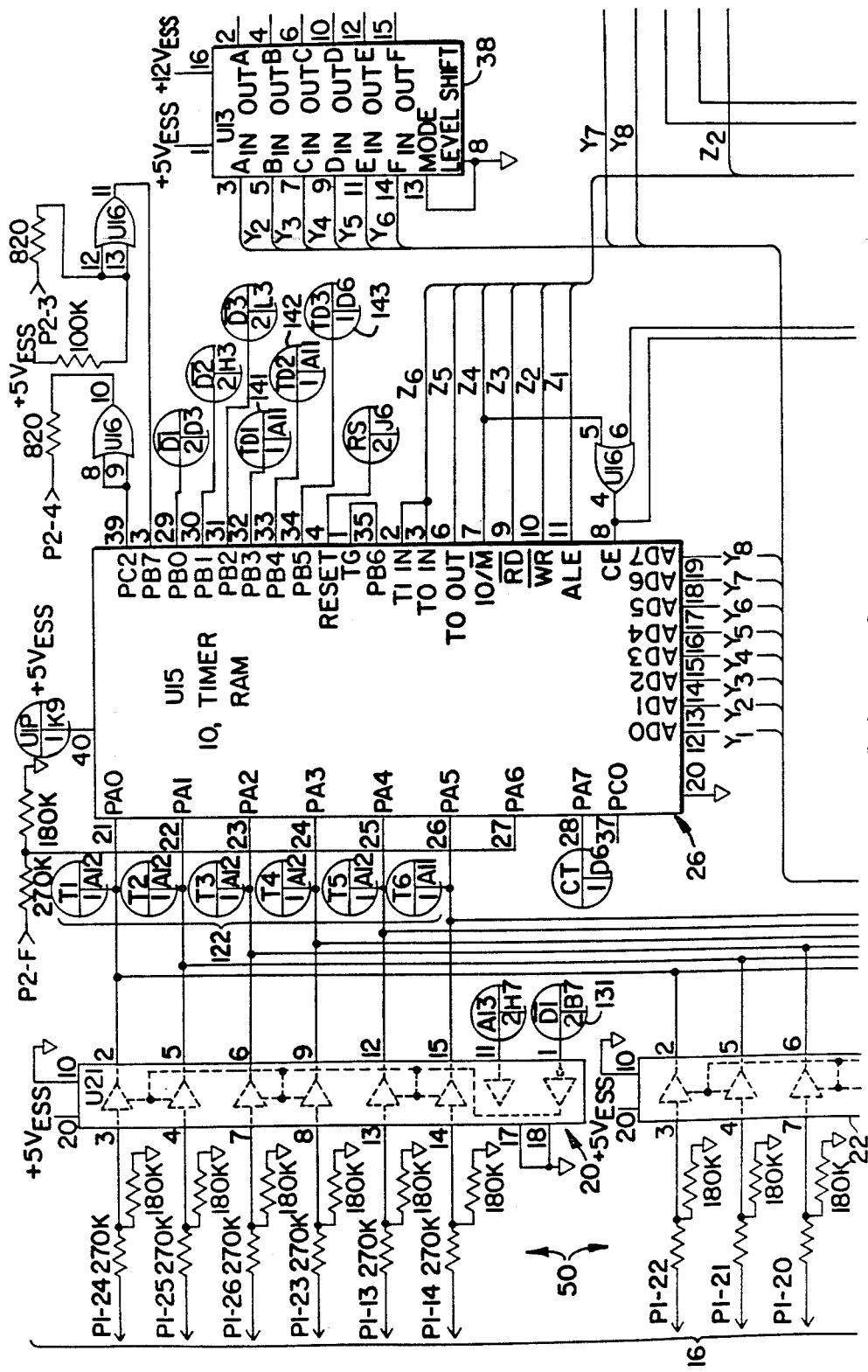
FIG._3A.

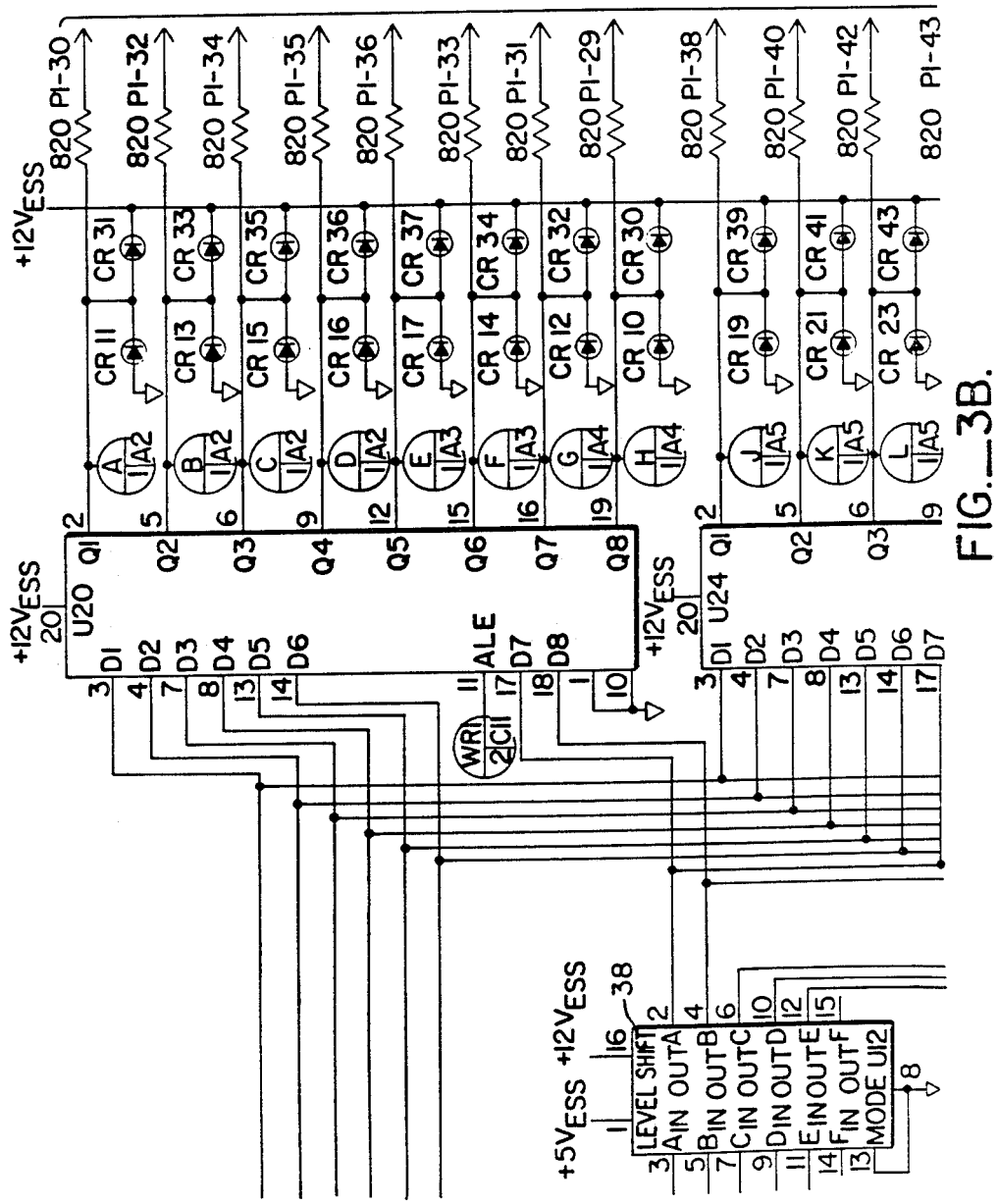
FIG._3B.

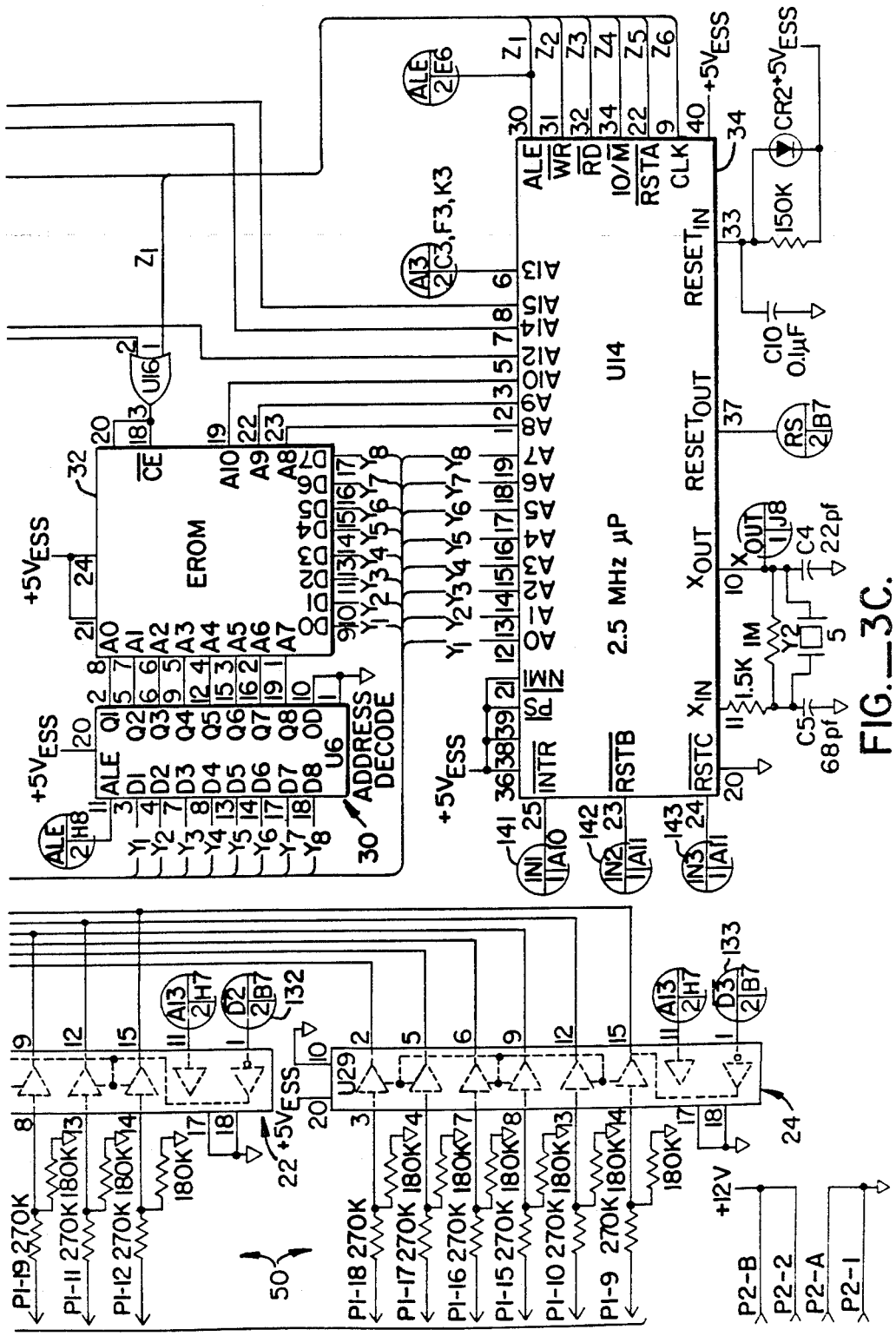
FIG._3C.

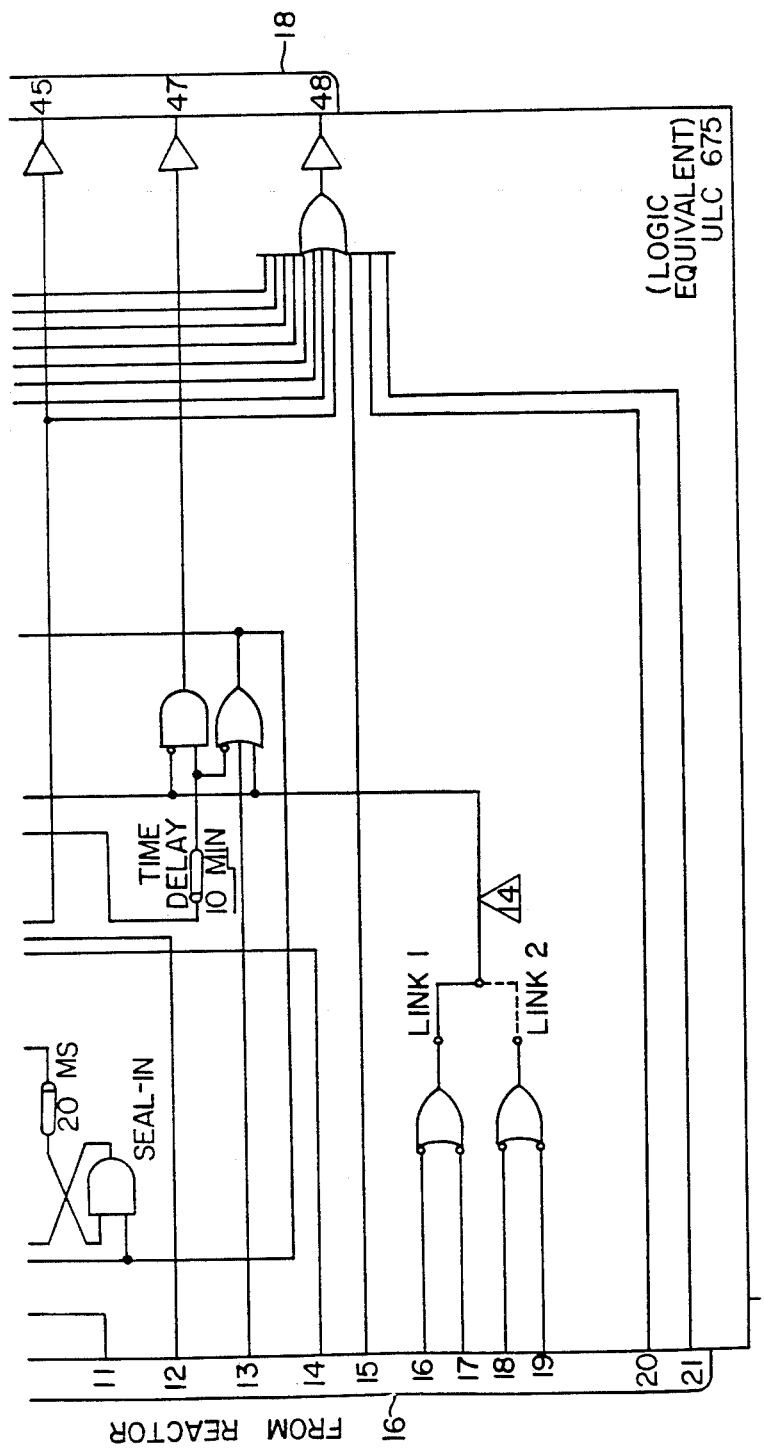
FIG._4B.
FIG._4.

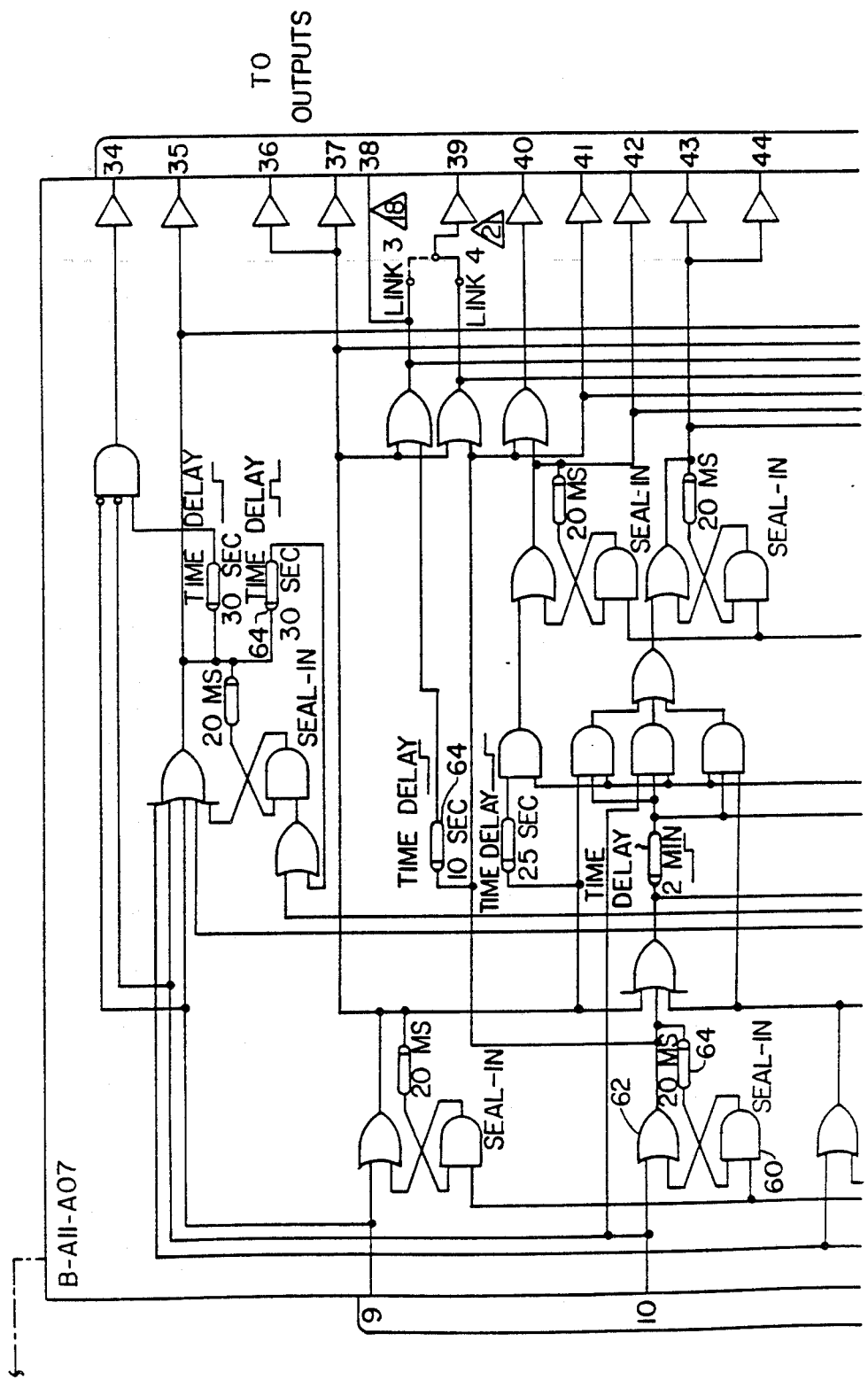
FIG._4A.

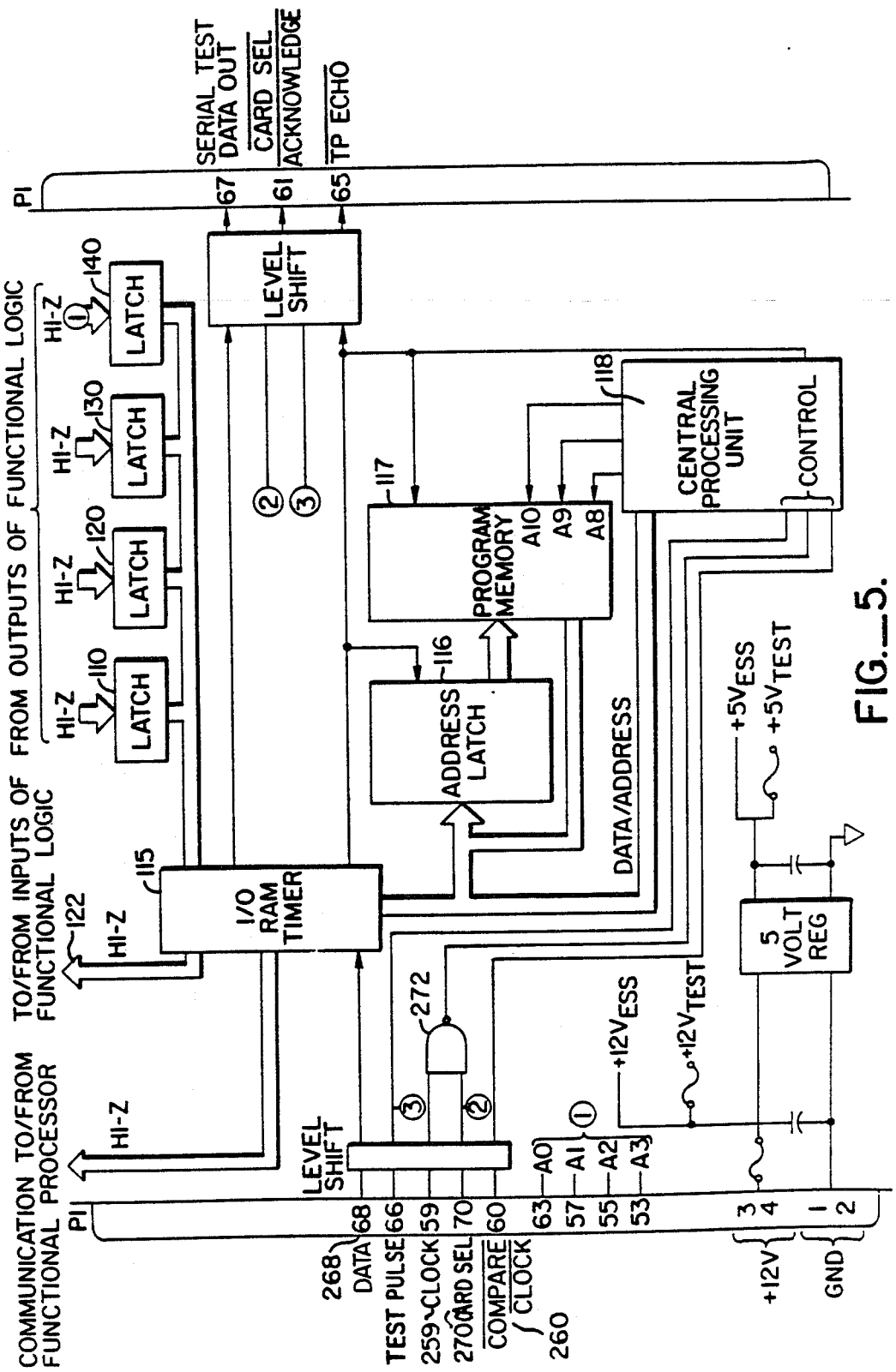
FIG.—5.

| DESIGNATION | REF TYPE | ESSENTIAL TEST | | I C DATA | | DESCRIPTION |
|---|---|---|---|---|---|---|
| | | +5V PIN | +12V PIN | +5V PIN | +12V PIN | COM PIN | |
| U4 | NSC810 | | | 40 | | 20 | RAM I/O TIMER |
| U15 | NSC810 | 40 | | | | 20 | RAM I/O TIMER |
| U3 | NSC800 | | | 40 | | 20 | MICRO PROCESSOR |
| U14 | NSC800 | 40 | | | | 20 | MICRO PROCESSOR |
| U1 | MM54C373 | | | 20 | | 10 | TRI-STATE OCTAL D-TYPE LATCH |
| U6 | MM54C373 | 20 | | | | 10 | TRI-STATE OCTAL D-TYPE LATCH |
| U8 | 14504 | 1 | 16 | | | 8 | HEX LEVEL SHIFTER |
| U12,13 | 14504 | | | 1 | 16 | 8 | HEX LEVEL SHIFTER |
| U11 | 4556 | | 16 | | | 8 | DUAL 1 OF 4 DECODER |
| U17 | 4555 | | | 16 | | 8 | DUAL 1 OF 4 DECODER |
| U19,23,26,27 | MM54C373 | | | 20 | | 10 | TRI-STATE OCTAL D-TYPE LATCH |
| U21,25,29 | MM54C373 | 20 | | | | 10 | TRI-STATE OCTAL D-TYPE LATCH |
| U20,24,28 | MM54C373 | | | | 20 | 10 | TRI-STATE OCTAL D-TYPE LATCH |
| U2 | NM27C16 | | | 24 | | 12 | CMOS PROM |
| U8 | NM27C16 | 24 | | | | 12 | CMOS PROM |
| U5,10 | 4071 | | | 14 | | 7 | OR GATE |
| U16 | 4071 | 14 | | | | 7 | OR GATE |
| U9 | 4049 | | | 1 | | 8 | HEX BUFFER/CONVERTER |
| U22 | 4502 | | 12 | | 16 | 8 | STROBED HEX INVERTER/BUFFER |
| U7 | μA723DM | | | | | 7 | VOLTAGE REGULATOR |

→ SERIAL TEST DATA OUT

→ SELECT ACKNOWLEDGE

FIG._5E.

| FIG. 5A. | FIG. 5B. |
|---|---|
| FIG. 5C. | FIG. 5D. |
| FIG. 5E. | |

FIG._5.

NOTES:
1. ALL RESISTORS ARE 1/8 WATT, PLUS OR MINUS 5% UNLESS OTHERWISE SPECIFIED.
2. ALL DIODES ARE IN4456 UNLESS OTHERWISE SPECIFIED.

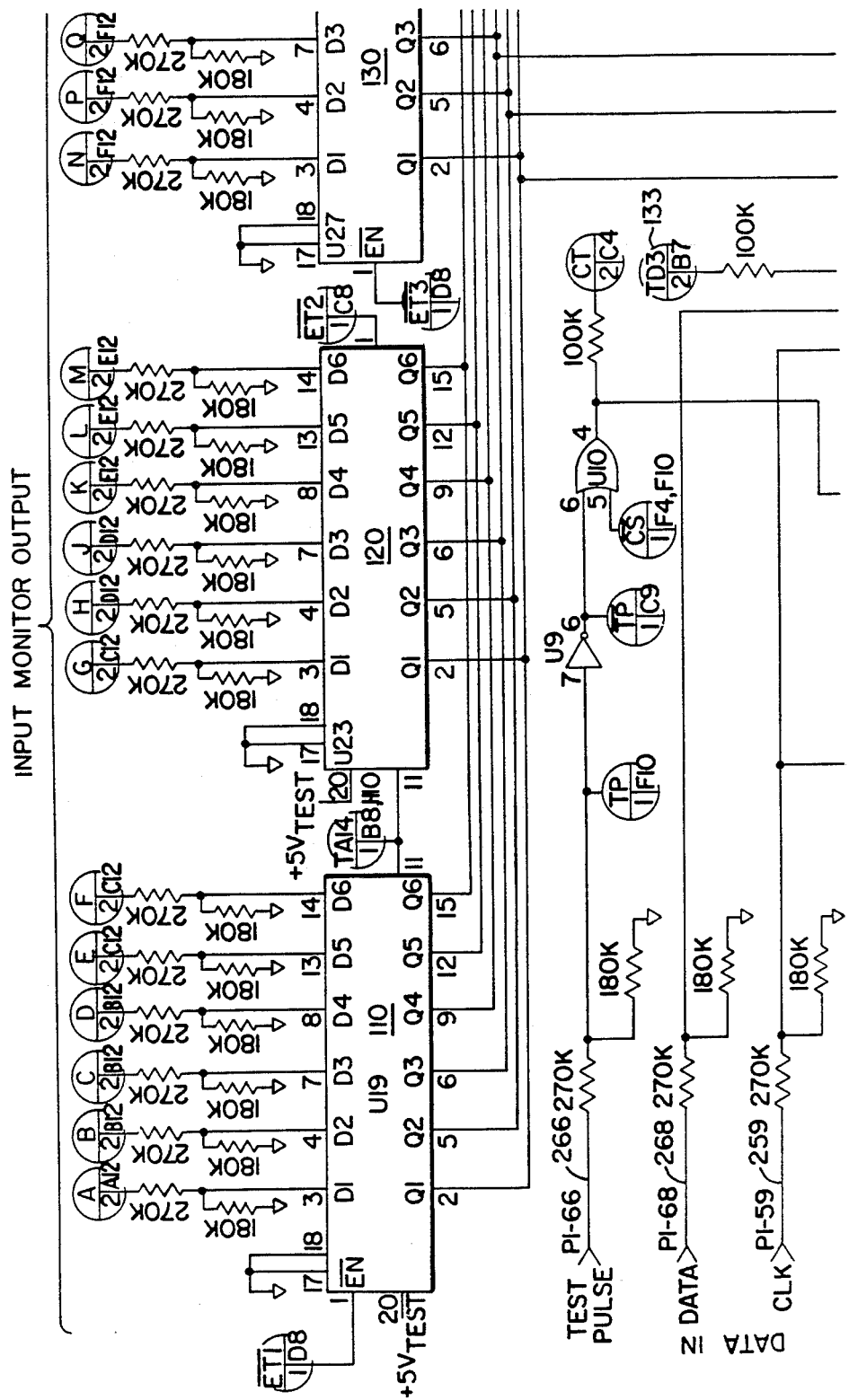
FIG._5A.

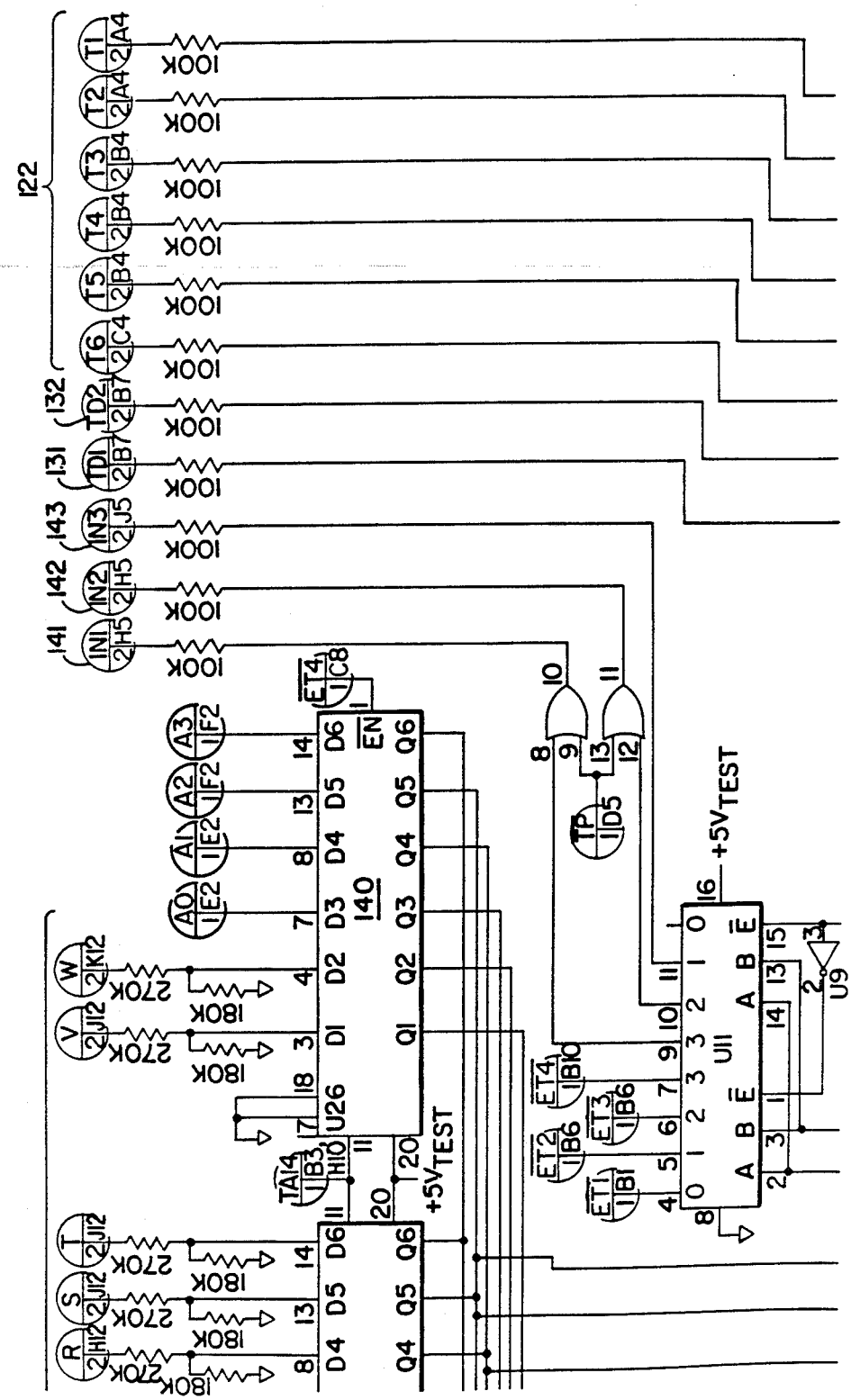
FIG._5B.

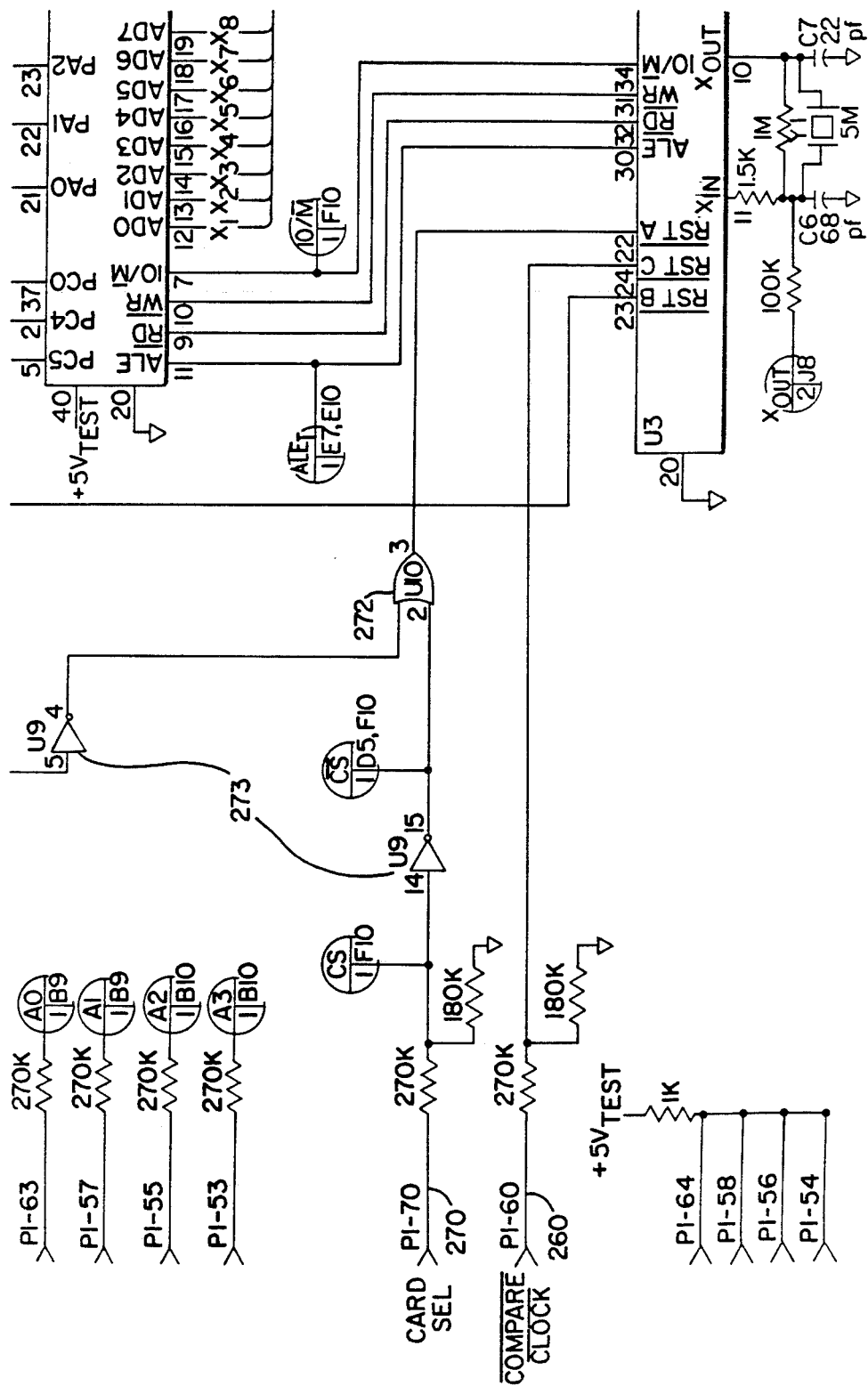
FIG._5C.

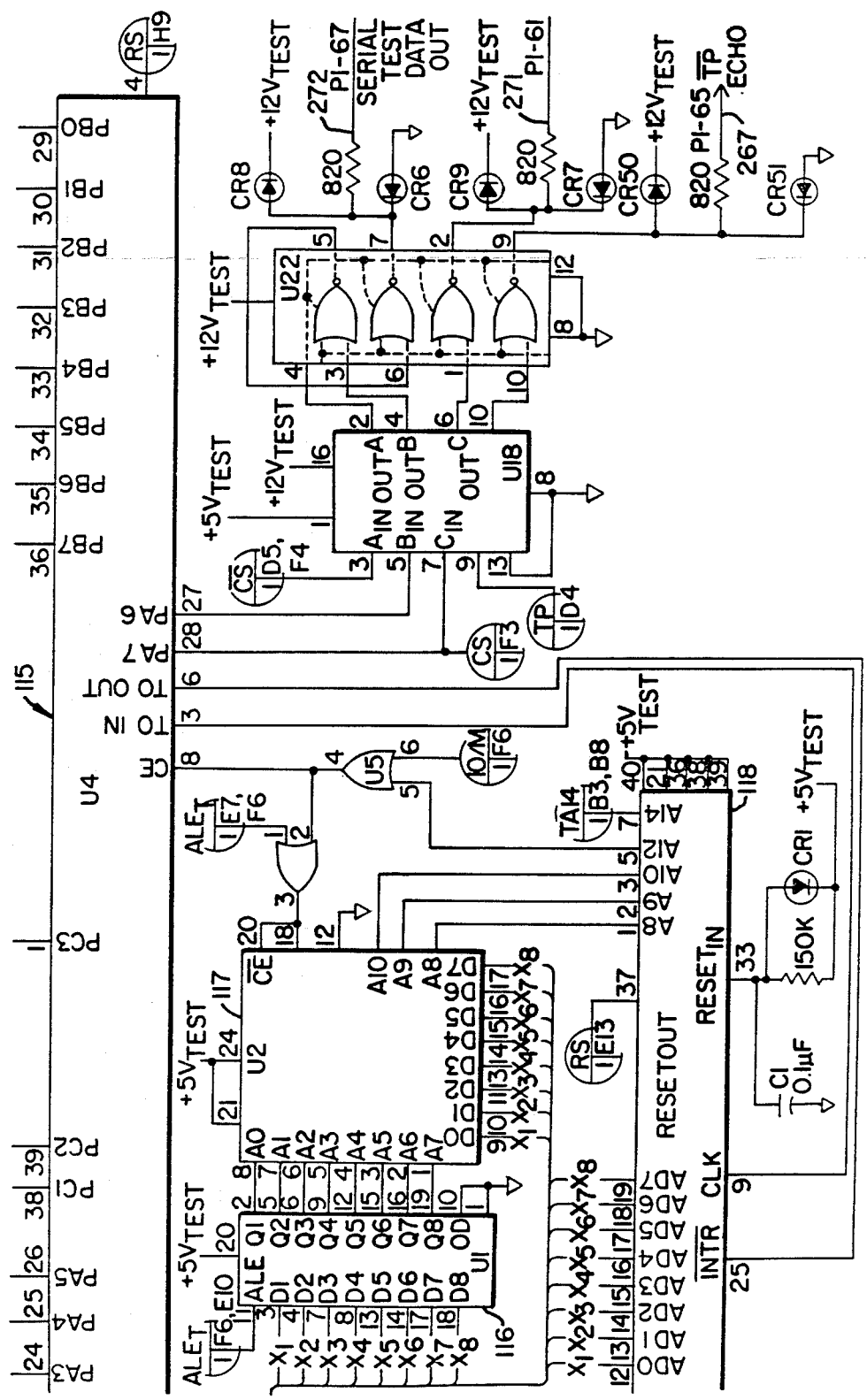
FIG._5D.

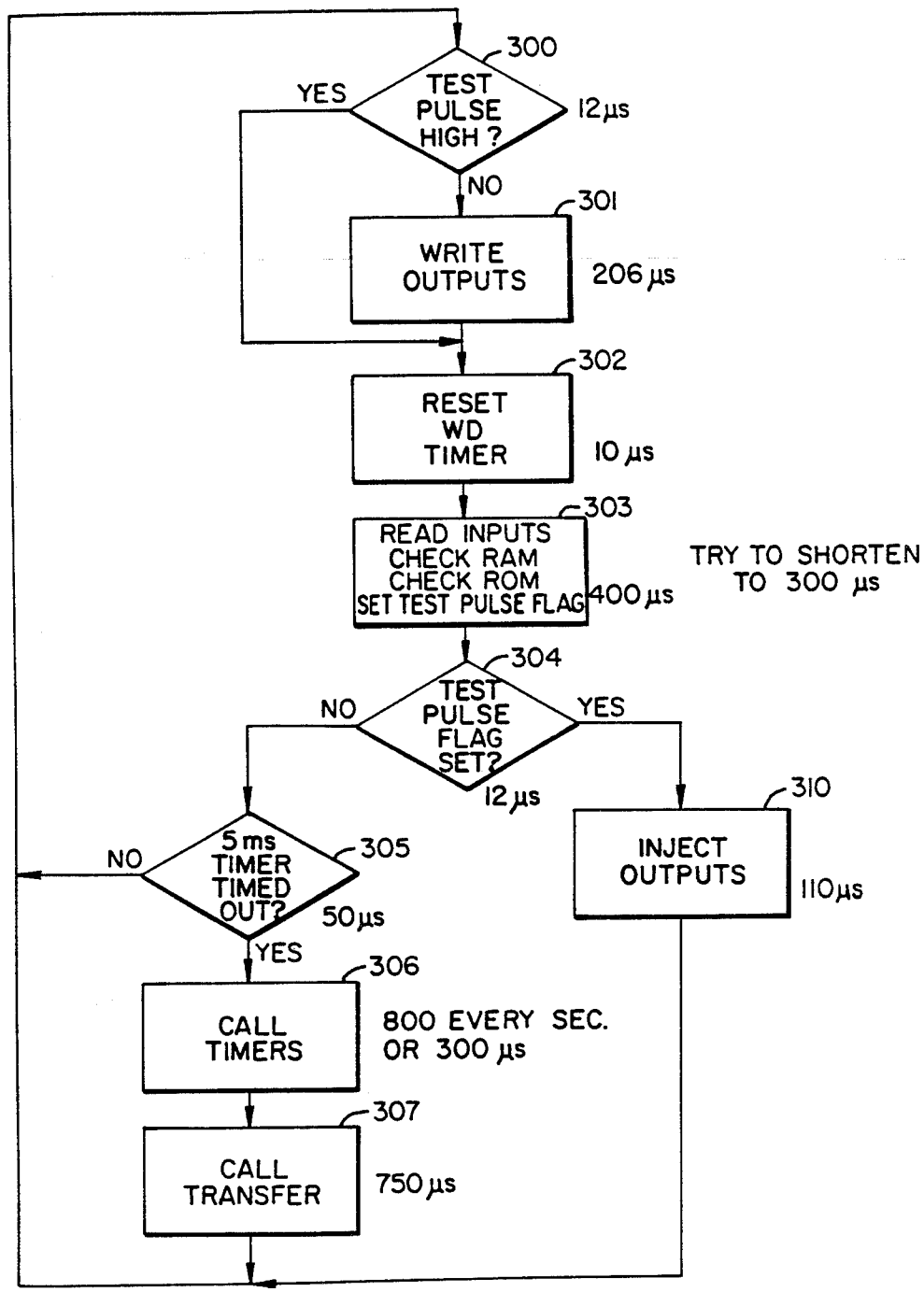
FIG._6.

UNIVERSAL LOGIC CARD

This is a continuation of application Ser. No. 449,221, filed Dec. 14, 1982, now abandoned.

A microfiche appendix consisting of one microfiche having thirty six frames and one microfiche having thirty two frames is included with this document. This document includes actual programming for the circuits of the Figures illustrated herein and contains information for digital programming of analog circuits.

BACKGROUND OF INVENTION

1. Field of the Invention

The present invention relates to nuclear plants and more particularly to a nuclear reactor protection system and a self-test system. Specifically, a universal logic card is disclosed which is capable of placement in any number of channels within such a nuclear reactor protection system. For example, between sensors such as core overheat sensors and a corresponding safety or operation function, such as the insertion of Boron to shutdown a reactor, there is located the universal logic card of this invention with pre-programmable digital logic contained thereon conformed to the particular channel in which the card is inserted. The card, pre-programmed to conform to the channel logic, executes the necessary channel logic to activate the protection system, responds to system-wide test using short duration pulses transparent to the actual operating system; and, executes self-test continually in the absence of either an actual system exercise or the generic tests under the system controller.

This invention relates to a self-test subsystem for nuclear reaction protection system. The applicant hereby incorporates by reference U.S. patent application Ser. No. 402,053, filed July 27, 1982, by Hill et al and assigned to the same assignee herein.

Nuclear protection systems include electronic controls, typically embodied in a discrete digital and analog format within circuit cards. These circuit cards are located intermediate between devices such as sensors (as for detecting core overheat) and controls (as for providing Boron injection to shutdown a reactor). In the referenced application, constant surveillance of the nuclear system protection system is provided by a system controller microprocessor. This system controller microprocessor serially addresses protection system circuit cards and loads them at predetermined input points with test commands. The addressed cards are thereafter simultaneously activated by system wide command. A test pulse is emitted which pulse is so short in duration that its effect is transparent to the reactor protection system and therefore cannot cause overall reactor protection system operation.

The transparent pulses, however, pass through the actual actuating electrical components of the cards to verify along the real actuating path the operating integrity of the system. After enduring an appropriate response interval, the output state of the system is recorded in system-wide resident registers. Thereafter, with the response data contained in these registers frozen at the recorded state, the output is read by a monitoring computer, typically the system controller microprocessor. This result is compared with the expectant output already contained in computer memory. If the correspondence between the memory output and the register output is found, the next sequential set of test commands is acted upon. If correspondence is not found, a sub-routine search is automatically conducted to locate the error. A protocol of redundancy even within the test system is disclosed in the incorporated by reference patent application.

2. Description of the Prior Art

In the system disclosed heretofore, each channel within the the nuclear power plant and the nuclear reactor protection system itself had to be discretely wired with discrete logic elements such as primitive gates and "relay trees". Volumes of up to hundreds of such cards were maintained in inventory for the many channels throughout a nuclear protection system. The costs of maintaining such are on site card inventory are high and the construction of numerous discrete hard-wired logic circuits is unnecessarily as well as expensive to manufacture.

Placing logic circuitry in software is well known. However, placement of digital logic in software for essential functions in reactor protection system operating channels has heretofore not been utilized. In short, software logic, has been ruled out as a candidate to substitute for discrete digital circuitry because of inability to verify correct operation of the software.

SUMMARY OF THE INVENTION

A universal logic card is disclosed which contains both pre-programmed functional circuitry for actuating channel logic and dedicated test circuitry for testing the functional circuits. This provides constant looping interrogation of the pre-programmed channel logic in absence of the system controller test. The disclosed card resides as a channel in a reactor protection system for a nuclear power plant. The card is pre-programmed in software read-only memory to perform the functions of discrete circuitry during actual plant operation. Additionally, the card responds to system controlled surveillance of the self-test system. In system controlled surveillance, a central microprocessor serially addresses system circuit cards such as the one disclosed and loads these cards at predetermined input points with test commands. The addressed cards are thereafter simultaneously activated by a system-wide command. A test pulse, whose duration is so short that it is in effect transparent to the system and therefore cannot cause overall operation, is released. The pulse passes through the pre-programmed channel logic on the universal card along the actual program actuated components to verify, on the real actuating path, the operating integrity of the system. After an appropriate response interval, the output state of the system is recorded in output registers and thereafter read under control from the controller computer. Finally, the programmed card in the absence of system-wide test is monitored by a looping secondary computer on the card and used exclusively for self-test purposes. This computer reads the card inputs and outputs, verifies the RAM and ROM memories, constantly monitors the system timers, and dependent upon overall state verifies the accuracy of transfer function within the card. This test circuitry is in effect disabled upon system controller testor only and even remains in operation during actual system manipulation using the programmed digital logic.

OTHER OBJECTS, FEATURES AND ADVANTAGES OF THE INVENTION

An object of this invention is to provide a card for insertion to a nuclear protection system which is capable of being programmed to fit within a plurality of control channels. The card includes a plurality of digital input channels, a plurality of digital output channels and programmable digital logic contained therebetween. The digital logic is contained in a non-volatile ROM. This logic is custom tailored to emulate analog and digital circuitry of discrete channels either in the form of logic gates or boolean equations, all having timer functions of various durations interconnected therewith. The pre-programmed card executes the programmed logic function between its input and output to provide the necessary reaction of the nuclear protection system through applicable transfer functions.

An advantage of the disclosed programmable logic is that the same card may be universally used throughout the system. Only the programming of the distributed intelligence upon the card need be changed. This programming, typically occurring in the form of a programmable ROM, conforms the universal card to the particularized channel logic in the system.

A further advantage of this invention is that inventory is reduced. In many applications, only the programmed ROM of the card need be inserted to conform a card for location at any location within a nuclear protection system.

Yet another object of this invention is to disclose a pre-programmable universal logic card capable of participating in system-wide test. According to this aspect of the invention, test circuitry is disclosed. This test circuitry is capable of reading in serial data under the control of the self-test system controller and thereafter executing system tests in response to signal from the self-test system controller. Upon system test, writing to the card output occurs. This output is thereafter read and compared to expected result by the self-test system controller. If correlation to the expected result is found, the test is passed; if correlation is not found to the expected result, the test is failed and the logic card replaced.

An advantage of this aspect of the invention is that the programmable logic card, like its analog and discrete digital predecessors, is capable of participation in system-wide test. This system-wide test of necessity utilizes the actual electronic components of the programmed universal logic card which would be required for actual system exercise. Simply stated, the real actuating path of the system is tested.

Yet another object of this invention is to disclose in absence of system test, a monitoring logic which is parochial to the particular universal logic card inserted. According to this aspect of the invention and in the absence of system tests under the control of the system controller, the parochial test logic on the card reads the card inputs, checks RAM and ROM for error, verifies the operational status of the system timers, executes actual calls on the system timers to verify their operation and finally verifies the required transfer functions of digital logical signals from input to output of the card.

An advantage of this aspect of the invention is that the card in effect tests its own discretely programmed channel logic. This channel logic is continually verified for proper operation and failing such proper operation the system is flagged for replacement of the card. Thereafter, and upon system poll by the self-test controller the card is immediately indicated as defective.

An advantage of this aspect of the invention is that the self-test disclosed in the universally programmable card upgrades the digital emulation of the analog and digital logic. A higher degree of reliability is provided even though the universal card with discretely programmable memory is utilized to substitute for analog and digital circuits.

BRIEF DESCRIPTION OF THE FIGURES

Other objects, features and advantages of this invention will become more apparent after referring to the following specification and attached drawings in which:

FIG. 1 is a block schematic of a nuclear protection system;

FIG. 2 illustrates a card array in the logic of such a system;

FIGS. 3, 3A, 3B, 3C and 3D illustrate essential circuitry;

FIGS. 4A and 4B are diagramatic logic of programmable analog and digital circuitry and timers placed in one of the channels of the nuclear system protection system;

FIGS. 5, 5A, 5B, 5C, 5D and 5E are a diagramatic representation of the test circuitry portion of a card including designation of actual components used; and FIG. 6 is a timing diagram of the essential logic function of the card illustrating how card self-test ensures stability to the pre-programmed digital logic disclosed.

DETAILED DESCRIPTION OF THE PREFERRED EMBODIMENT

An extensive appendix is filed herewith. This appendix includes sample programmable material directly applicable to the microprocessors and the specific circuits here illustrated. The programmable material demonstrates how one may program digitally a microprocessor to emulate analog and digital circuitry. The reader will understand that this much is known in the prior art. Nevertheless digital programming to emulate analog and digital circuits is disclosed herein.

Additionally and as part of the appendix filed herein, applicant includes performance specifications. Again the specifications are disclosed with purpose of allowing the reader to duplicate the invention.

Finally, the drawings herein include reference to the applicable electronic components and their operative connections. In many cases, pin numbers remain on the components. It will be understood that the programmable logic placed within this card is the subject of parallel copyright protection.

The abstract of the above incorporated application is repeated immediately below so that the reader may understand the environment wherein the invention herein resides.

SUMMARY OF INCORPORATED APPLICATION

A self-test system for a nuclear power plant, nuclear reactor protection system is disclosed. Nuclear protection systems are the electronic controls, typically including circuit cards, located intermediate between sensors (as for detecting core overheat) and a control (as for providing rod injection to shut down a reactor). Constant surveillance of the nuclear system protection system is provided by a microprocessor that serially addresses protection system circuit cards and loads them at pre-determined input points with test commands. The addressed cards are thereafter simultaneously activated by a system-wide command. The test command is a pulse which is so short in duration that its effect is transparent to the system and cannot cause overall system operation. The pulse passes through the actuating electrical components to verify, on the real actuating path, the operating integrity of the system. After an appropriate response interval, the output state of the system is recorded in system-wide resident registers. Thereafter, with response data contained in these registers frozen at the recorded state, the output is read. This result is compared with the expected output in computer memory. If correspondence between memory output and register output is found, the next sequential set of test commands is acted upon. If correspondence is not found, a subroutine search is automatically conducted to locate the error. The disclosed self-test subsystem is duplicated in four separate divisions with each division testing one of the four duplicate protection systems. The three remaining and idle divisions constantly monitor the active subsystem's operation. The end result is an overall system which reduces the mean time to discover error, thus minimizing mean time to repair and maximizing protection system availability and safety. The separation of the protection system into four duplicate divisions is not dependent on the disclosed invention and the invention may be applied to protection systems with a different number of divisions.

A representative claim from the incorporated by referenced application is:

1. A self-test system for a nuclear reactor protection system (RPS), comprising:

a processor for generating a series of RPS test patterns and test vectors, said processor including a series of related expected test results;

a plurality of self-test elements coupled to said processor for receiving said test vectors and adapted to receive and store related actual test results from the RPS;

first means responsive to commands from said processor for selecting from said self-test elements those self-test elements corresponding to said RPS test patterns;

second means responsive to commands from said processor for generating a short duration test pulse, transparent to RPS operation, and adapted to effect injection of said test vectors into the RPS by said self-test elements;

means coupled to said self-test elements for monitoring said actual test results and coupled to said processor for comparing said actual test results with said expected test results; and means coupled to said monitoring and comparing means and for indicating differences between said actual test results and said expected test results.

FIGS. 1 and 2 are respective copies of FIGS. 1 and 6 of the incorporated application. Simply stated, a self-test system for a nuclear reactor protection system is divided for safety purposes into discrete and oft times redundant divisions, there being four divisions in the protocol herein illustrated. Each system division includes a self-test controller (STC) which through an interface monitors and verifies correct operation of the nuclear system protection system. It is to this nuclear system protection system (NSPS) that the cards of this invention fit. Each system or division must interface with the actual controls. It is these systems which display to control room indicator 43 and attendant operators failures of various parts of the system.

The reader will note that as a part of the system fails, the redundancy provided allows one of the remaining divisions and ambiguous protection system elements to supplant itself for any failed element. The problem addressed is how to keep the mean time between failure of an operating card and substitution therefore with a replacement card to a minimum.

Referring to FIG. 2 the reader can be given some idea of the ambiguity of the system. Each ambiguous division contains cards 60. System test is controlled by a card select monitor 54. The systems are discretely monitored and output their status serially through line 6 to a controlled input/output port. What is disclosed within the confines of this invention is a logic functional card such as the first card in system A.

The reader may well consider the construction of such a card. Heretofore, and in the order of FIG. 4 of this invention, analog or digital circuitry has comprised the make-up of each card. There are literally thousands of such cards in a nuclear safety system protection system. This being the case, extensive inventories of many hundreds of cards have been maintained.

The present invention discloses a standard card. This card no longer has discretely wired analog or digital elements. Instead it is digitally programmed. The programming includes timers. For example, the functions embodied in the analog and digital circuit of FIG. 4 can be digitally programmed. In short, the system enables replacement of all the discretely wired cards 60 within the main part a standard card.

Having set forth the environment in which the invention rests by the incorporation and summary contained herein of the previously filed application, the remainder of the invention will first be set forth. First, and with reference to FIG. 3, the electronic layout of the essential circuitry will be set forth. Secondly, and with reference to FIG. 4, an subject to software realization analog and digital circuit will be discussed. In this discussion, the reader will be assumed to know that it is common in the prior art to digitally program analog and digital logic with discrete timers therein. Should the reader have specific question, attention is invited to the appendix filed herewith which renders such programming apparent. Finally, and with reference to FIG. 5 the test circuit will be set forth. The test circuit, an area of essential novelty, will be demonstrated as boosting the reliability of the programmed analog circuitry to a level where such programmable analog and digital circuitry can be tolerated within the environment of a nuclear safety system protection system. First, testing in response to the self-test system controller will be set forth. Second, testing in absence of self-test system controller test will be set forth. Again, attention is invited to the appendix filed herewith.

Referring to FIGS. 3, 3A, 3B, and 3C, 12-volt logic in 16 and 12-volt logic out 18 are disclosed. The reader will observe that 18 bits of logic in and 20 bits of logic out are here contemplated. These inputs and outputs are variable dependent upon the application. Latches 20, 22, 24 are 8 bit with 2 bits tied to ground. These respective latches input to a combination I/O RAM and timer chip 26.

The computer construction is more or less conventional. It includes an address latch 30, a programmable read only memory 32, a central processing unit 34, a latch decode 36, a level shifter 38 with respective output latches 40, 42, 44.

Some attention should be given to circuitry utilized with the card for isolation purposes. Broadly the latches include resistors of relatively high impedance 50 which constitute both a divider network and an impedance to transient voltages attempting to penetrate the system. Similar protection is provided by a diode network 60 on the system output; voltage levels are restricted to diode pass levels to ground.

Having set forth the essential circuitry, reference may now be had to FIG. 4. FIG. 4 illustrates analog and digital circuitry the function of which circuitry can be executed by programmable digital logic interposed between. The particular circuitry illustrated herein is useful in a particularized card. By way of example, reactor high dome pressure, reactor low water level trip are among some of the inputs utilized. Exemplary outputs include annunciators for the high dome pressure, the low water level trip and associated resets.

An analog logical train appears. This train includes AND gates 60, OR gates 62 and three discrete types of timers 64. Digital programming realization of such analog logic is known.

Referring to FIG. 5, the test circuitry of this invention can be understood. First, the reader had best be informed of two types of discrete tests which the programmable logic of this card is subjected to.

The first type of test is that test disclosed in the reference by incorporation patent application. Specifically, and on command from a self-test system controller, segments of the system are sequentially tested. Testing occurs by actual pulses. These actual pulses are of sufficiently short duration to be transparent to the operating system.

There is a second type of test. This second type of test is under the control of the microprocessor illustrated in FIGS. 5, 5A, 5B, 5C, 5D. In absence of a system test sponsored by the system controller, the microprocessor of FIG. 5 in effect continually monitors the microprocessor disclosed in FIG. 3. It is this continual monitoring that promotes the reliability of the programmable logic of FIG. 3 to a level where it can be tolerated in the environment of a nuclear system.

Referring to FIG. 5, inputs from the logical output 18 are gated through a latch system composed of latches 110, 120, 130, 140. These latches are in turn controlled by an input, output, RAM, timer 115; an address latch 116, a programmable memory 117, and a central processing unit 118.

It is necessary that the functional logic at the input to the card be read. Accordingly, inputs 122 (see FIG. 3A) are gated into the microprocessor. It will be noted that the respective inputs 122 are on the output side of the respective latches 20, 22, 24. This being the case, discrete addressing of the data from the particular intergated latch must be input. Referring to the details at 131, 132, 133 of FIGS. 3A and 3B corresponding by numbered inputs may be found on FIGS. 5A, 5B, 5C and 5D.

As will hereinafter become more apparent, it is necessary for the test processor to know whether or not the essential circuitry is occupied responsive to a main controller initiated test. Accordingly, outputs 141, 142, 143 have connection to inputs 131, 132, 133 these respective inputs allow the self-test function of the microprocessor to be initiated. See FIGS. 3A and 5A, B, respectively. These outputs may be optionally used, in practice card select is sufficient to transmit the required information.

Remaining auxiliary data can now be set forth. In initiating tests, the main controller must call upon and select cards. This is done through the input 270 and the OR gate 272 having an inverter 273 to the central processing unit to provide an overall NAND. The resultant NAND gate allows the system clock input 259 and the compare clock 260 (FIG. 5C) to signal for the output of operational status data.

The serial data for test is loaded through the logic of the input output and the microprocessor into the varying inputs of the system. It will be noted that sometimes during a test it is desirable to have certain states on the card output. These states are useful in testing downstream cards. By the expedient of loading the inputs and utilizing the system to transfer appropriate states to the card outputs, downstream tests can occur.

When the data is serially loaded for test under the system controller, a test pulse is initiated. This pulse passes into the system through line 266 (FIG. 5A) and causes the operating system transparent pulse to actuate the logic of FIG. 3. Thereafter and dependent upon the states of the timers and the particular function programmed the system output state is read. Typically the read data passes out through a serial test data out output 272 (FIG. 5D).

Appropriate safeguard must be taken to make sure that the card selected acknowledges selection. Accordingly, an output a select acknowledge 271 is included in the system. Further a test pulse echo 267 (FIG. 5D) is likewise included in the system. By the expedient of waiting for the select acknowledge and waiting for the test pulse echo, the system controller can know that the appropriate test has been utilized.

System powering will not be disclosed save to set forth the fact that the fuse to the test circuitry is isolated from the fuse to the essential circuitry. Likewise, it will be seen by the reader that all inputs include high impedances. Voltage transients, in the test circuitry are thus prevented from affecting the operation of the essential logic. Further, failure of the test circuitry will not prevent the essential logic from operating, because the signals at the latch outputs will overwhelm signals input from the test circuitry. At the same time, the input latches 110, 120, 130 and 140 (FIG. 5) all include voltage dividers so that the 12-volt input for noise suppression can be divided down to 5-volt logic levels for reception to the entirety of the system. Having set forth the construction of the system, attention will now be devoted to the block diagram of the computer logic.

Circuitry operation, can now be discussed. Referring to FIG. 5 at compare clock input 260, this section of the disclosed apparatus causes registers indicating the status of the input and output to be read whenever a compare clock signal is received. This signal can thus be read at any time during test or actual plant operation.

Data to a particular card can be sent by actuating the card select and clock pulse. Thereafter reception of actual data giving a card a pre-determined status can be undertaken. For example, where portions of the system are being tested, either under control of the main system controller or alternately by manual operator check of a discrete branch of the safety system, specific data can be clocked into the card. Typically, data to be passed through the card on a given transfer function will be clocked into upstream cards and emitted downstream. Likewise data for downstream cards will clocked into a discrete card and emitted.

Assuming that a test pulse of short and transparent duration to the actual operating system is desired, such a pulse is received at 266 (FIG. 5A), typically with a simultaneous compare clock signal. Execution of the transfer of inputs to outputs occurs. It is to be noted that during a test both the input and output latches as well as the processor and internal wiring an overall readability of the signal will be obtained. Moreover, and upon any receipt of a compare clock signal status of the card selftest will likewise be obtained.

The status of the card in actual exercise can be understood. Specifically, and since the test pulses are of short duration, actual exercising pulses will be of long duration. These signals will appear at the inputs, be gated through the programmed digital logic in accordance with designed analog and digital circuit and appear at the outputs dependent upon gating and timer status.

Self-testing of the card under control of the card processor 118 (FIG. 5) can best be understood with respect to FIG. 6, a diagram of the timer logic. The self-test logic is operative to perform looping at all times save and except when a test under operation of the system controller is occurring. During test of the system controller, the loop changes as illustrated.

Referring to FIG. 6 and at box 300, the system first tests to see whether a system controller test is initiated. If it is not, writing to the output occurs at 301. At 302, a reset of the watchdog timer occurs to time the card through its desired loop. Thereafter, and in conformance with known error correction code protocol, the system reads inputs and checks RAM and ROM with various check sum protocols to make sure error is absent. Assuming no test is in progress, a test absent signal gates the looping protocol to a timer. The timer protocol 305 determines whether on a 10 microsecond basis the timer has timed out. Assuming a timer out updating of the resident timers is made at 306. Dependent upon timer status and input transfer functions are then compared at 307.

It will be noted to the right of the boxes there appear microsecond time intervals. These microsecond time intervals give the approximate length of the whole procedure.

Assuming that the timers are not timed out it will be noted that the top loop consisting of 300, 301, 302, 303, 304, 305 repeats.

Assuming that a test is in progress, no write to the outputs will occur as it would interfere with test results.

Likewise, the outputs are injected with any desired data so that system controller test can occur. See 310 FIG. 6.

We claim:

1. A universal logic card adapted to execute a selected transfer functions in a nuclear power plant comprising:
    first programmable digital logic means including;
    a plurality of input latches,
    a plurality of output latches,
    a first digital processor,
    a first programmable memory means effective to direct said first digital processor to execute said selected transfer function, and
    first means for controlled coupling of said first digital processor to said plurality of input latches and said plurality of output latches to operate said selected transfer function in real time analog an actual operating path for exercising responses to said transfer function;
    second means for controlled coupling including;
    a second digital processor,
    means selectively coupling said input latches to said second microprocessor,
    means selectively coupling said output latches to said second microprocessor, and
    second program memory means effective to direct said first digital processor to execute said transfer function and to compare the input latches and output latches for verifying processing of said selected transfer function;
    third means for controlled coupling of said first digital processor to said plurality of input latches and said plurality of output latches to operate said transfer function in a short time transparent domain along said actual operating path to test, but not exercise, responses to said transfer function.

2. The universal logic card of claim 1 and including:
    means to disable said second digital processor when said first and third means for controlled coupling operates said transfer function.

* * * * *